United States Patent [19]
Kaspar et al.

[11] 3,880,968
[45] Apr. 29, 1975

[54] PROCESS FOR PRODUCING A GRANULAR MATERIAL FROM A SOLUTION AND/OR SUSPENSION

[75] Inventors: Jan Kaspar, Muttenz, Switzerland; Edouard Kieffer, Saint-Louis, France; Michael Rosch, Allschwil, Switzerland

[73] Assignee: Ciba-Geigy AG, Basle, Switzerland

[22] Filed: June 26, 1972

[21] Appl. No.: 266,349

[30] Foreign Application Priority Data
July 1, 1971   Switzerland.......................... 9684/71

[52] U.S. Cl. ............ 264/37; 264/117; 264/DIG. 51
[51] Int. Cl............................................... B01j 2/16
[58] Field of Search................ 264/117, 37, DIG. 51

[56] References Cited
UNITED STATES PATENTS
3,186,928  6/1965  Keaton et al. ....................... 264/117
3,195,958  7/1965  Goins................................... 264/117
3,748,103  7/1973  Bean et al. ........................... 264/117

*Primary Examiner*—Donald J. Arnold
*Assistant Examiner*—J. R. Hall
*Attorney, Agent, or Firm*—Wenderoth, Lind & Ponack

[57] ABSTRACT

A process for producing a granular material from a solution and/or suspension includes forming a fluidized bed of granular material and spraying the solution and/or suspension onto the bed. Granular material is withdrawn from the bed and then sifted. After the material has been sifted, fine fractions of the material, and coarse fractions having grain sizes greater than 0.15 mm. are returned to the bed.

This process produces a granular material in which at least 70% of the grains have a grain size in the range from 0.15 to 2 mm.

11 Claims, 5 Drawing Figures

PROCESS FOR PRODUCING A GRANULAR MATERIAL FROM A SOLUTION AND/OR SUSPENSION

FIELD OF THE INVENTION

This invention relates to a process for producing a granular material from a solution and/or suspension. The granular material in this invention is material in the form of granules of a desired size which have been formed from the solution or from particles of a smaller size, and the term "granulating" when used in the following specification and claims is intended to mean the formation of granules in this way.

BACKGROUND OF THE INVENTION

In a previously proposed process a fluidized bed of the granular material is formed, and the solution and/or suspension is sprayed onto the bed. Granular material is withdrawn from the bed, the withdrawn material is sifted, and the fine fractions of the material are returned to the bed. A disadvantage of this process is that material tends to agglomerate in the bed. This agglomeration disturbs the bed and may affect adversely the quality and quantity of the granular product. It is an aim of the present invention to at least reduce this agglomeration.

According to one aspect of the present invention there is provided a process for producing a granular material in which at least 70% of the grains have a grain size from 0.15 to 2 mm.; said process comprising forming a fluidized bed of granular material, dispensing a solution and/or suspension onto the bed, withdrawing granular material from the bed, screening the withdrawn material, and returning to the bed fine fractions of the material, and coarse fractions having grain sizes greater than 0.15 mm.

This process ensures that particles which are already of the required grain size are returned to the fluidized bed. This increases the circulation between the fluidized bed and the screening zone, and maintains a sufficient quantity of granular material in the fluidized bed. If a sufficient quantity of material was not maintained in the bed, it would be necessary to increase the amount of solution and/or suspension dispensed onto the bed. This would cause the fluidized bed to be excessively wetted, and this in turn would affect adversely the quality of the bed. It has also been found that an increase in the quantity of the material circulated between the fluidized bed and screening zone reduces agglomeration in the fluidized bed.

The various steps of the process may be adjusted to provide optimum operating conditions for a material being granulated.

To carry out the method of the invention there is provided apparatus for producing a granular material, comprising a granulating chamber having a fluidized bed zone, an air screening chamber, a first perforated floor for the granulating chamber, a second perforated floor, lower than the first floor, for the air screening chamber, a discharge conduit passing from the fluidized bed zone to an inlet of the air screening chamber, a return conduit passing from a return outlet of the air screening chamber to the granulating chamber above the fluidized bed zone, a guide conduit to direct a gas stream upwardly through the perforated floors, a temperature control to control the temperature of the gas flowing through the granulating chamber floor, a dispenser for dispensing liquid onto the fluidized bed zone, and a pressure control to adjust the pressure difference between the two chambers.

In order that the invention and its preferred features may be better understood, an embodiment of the invention will now be described with reference to the accompanying drawings in which:

FIG. 1 is a diagrammatic side view, partly in section, of an apparatus for producing a granular material; and FIGS. 2 to 5 are views, partly in section, of component parts of the apparatus illustrated in FIG. 1.

DESCRIPTION OF THE PREFERRED EMBODIMENT

Figure 1:
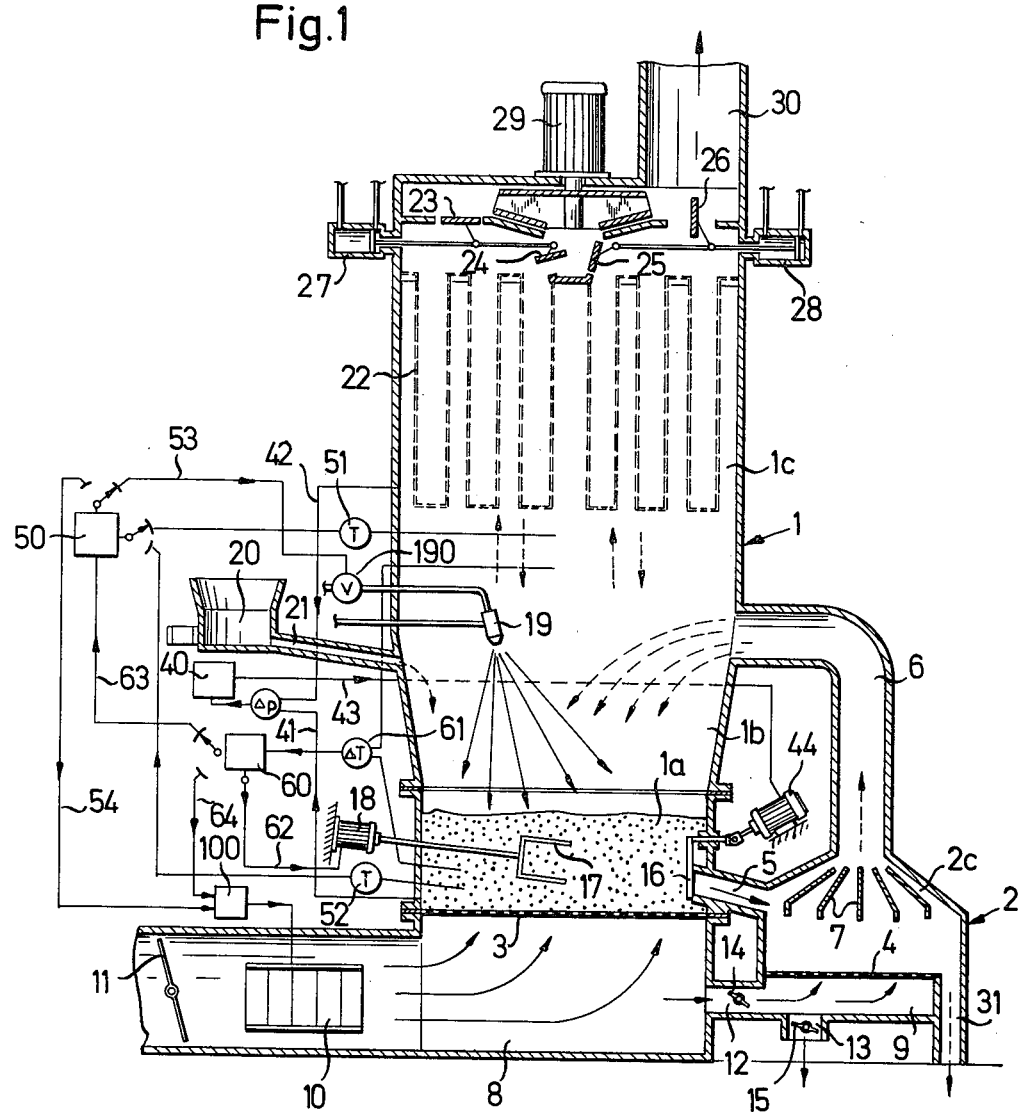

Apparatus for carrying out the method comprises two upright chambers 1 and 2, each provided with a perforated floor 3 and 4 respectively. The larger chamber 1 constitutes a fluidized bed granulating chamber, and the smaller chamber 2 an air screening chamber. The perforated floor 4 of the air screening chamber is at a lower level than the floor 3 of the granulating chamber 1.

The granulating chamber 1 communicates with atmosphere via its perforated floor 3 and a duct 8. This duct 8 contains a heater 10 and a control flap 11. The space 9 beneath the perforated floor 4 of the air screening chamber 2 communicates with the duct 8 via a conduit 12 and with the atmosphere via a conduit 13. The conduits 12 and 13 each contain a control flap 14 and 15 respectively.

The granulating chamber 1 has three different cross-sectional zones 1a, 1b and 1c, of which the lower zone 1a and the upper zone 1c are cylindrical. The lower zone 1a has a small cross-section, while the middle zone 1b forms a conical connection; all these cross-sections are preferably circular. An agitator 17 adapted to be driven by a motor 18 projects into the lower zone 1a. In the boundary region between the middle zone 1b and the upper zone 1c there is a downwardly directed spray nozzle 19 for liquid. The nozzle 19 is mounted so as to be movable by a motor over a chosen path. A conduit 21 for pulverulent materials leads into the middle zone 1b from a metering and feed device 20. The upper zone 1c is closed by a dust filter 22. A duct system containing a plurality of flaps 23 to 26 and adapted to be changed over by means of two flap drives 27 and 28, together with a fan 29 are disposed above the dust filter 22. A waste air spigot 30 leads from the said duct system to the atmosphere. Depending upon the setting of the flaps 23 to 26, the fan 29 will draw hot air from below up through the chambers 1 and 2 or force air from above through the filter 22. The latter phases are relatively short and are used to clean the filter 22 by reverse flow.

To produce the upwardly directed air stream, the fan 29 may be replaced by a blower (not shown) connected to the duct 8. In that case, the connection 13 of the air screening chamber 2 would be connected across this blower or to the input part of the duct 8.

The arrangement employing the filter 22 may be replaced by an arrangement using a cyclone. The dust deposited in this cyclone is then recycled via a conduit which preferably leads into the conical zone 1b of the granulating chamber, preferably below the recycling conduit 6.

The air screening chamber 2, which is much smaller and more particularly much lower than the granulating chamber 1, is of rectangular cross-section with a side ratio of about 1:7 in this example; in the drawing, the long sides are parallel to the drawing plane. Preferred side ratios are from about 1:5 to 1:10. The cross-section may also be rounded off very considerably at the corners, and more particularly be approximately elliptical. A conduit 5 provided with a control flap 16 leads from just above the perforated floor 3 of the granulating chamber 1 into an upper level of the air screening chamber 2. The latter converges pyramid-fashion at the upper part, where it has baffle plates 7. A second conduit 6 leads from the apex of the pyramid of the air screening chamber 2 into the upper zone 1c of the granulating chamber 1. During operation, the flaps 14 and 15 are so controlled that the upwardly directed air flow in the granulating chamber is less than in the air screening chamber 2, so that there is a suction into the chamber 2 in the conduit 5 and a pressure flow from the chamber 2 in the conduit 6. The conduit 5 is therefore referred to as a discharge conduit and the conduit 6 as a recycling conduit. The final granular product is discharged via the air screening chamber conduit 31.

The apparatus is provided with a differential pressure controller 40. The two measuring inputs of this controller are connected via lines 41 and 42 to the lower and upper zones 1a, 1c respectively of the granulating chamber. The pressure controller 40 controls a drive member 44 for the control flap 16 via a line 43.

The apparatus is also provided with a temperature-controlled controller 50. The measuring element of this controller is adapted to be selectively connected to a temperature sensitive element 52 or 51 respectively disposed in the lower zone 1a and in the upper zone 1c. By way of line 53 the controller 50 controls an adjusting member 190 for the metering of the liquid to the nozzle 19, or else by way of line 54 the controller 50 controls the set-value of the controller 100 which controls the energy supply to the heater 10 by means of an adjusting element (not shown).

The apparatus is also provided with a temperature differential controlled controller 60. The measuring element of this controller 60 is connected to a temperature difference measuring device 61, the first temperature sensitive element of which is disposed in the fluidized bed zone 1a and the second temperature sensitive element of which is disposed in the upper zone 1c. By way of a selectively connectable line 62, the controller 60 controls the drive motor 18 for the agitator 17 and/or either controls the set-value of the controller 50 via the line 63 or the set-value of the heating controller 100 via line 64.

Figure 2:
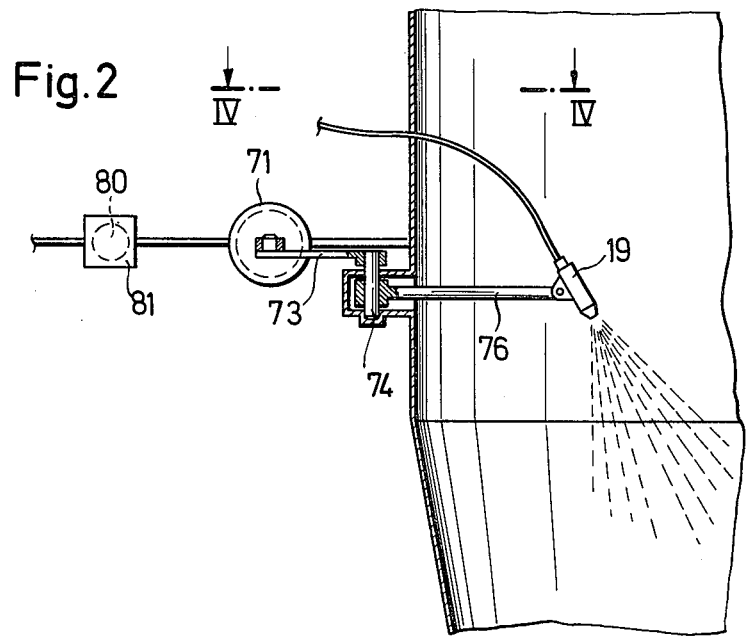
Figure 4:
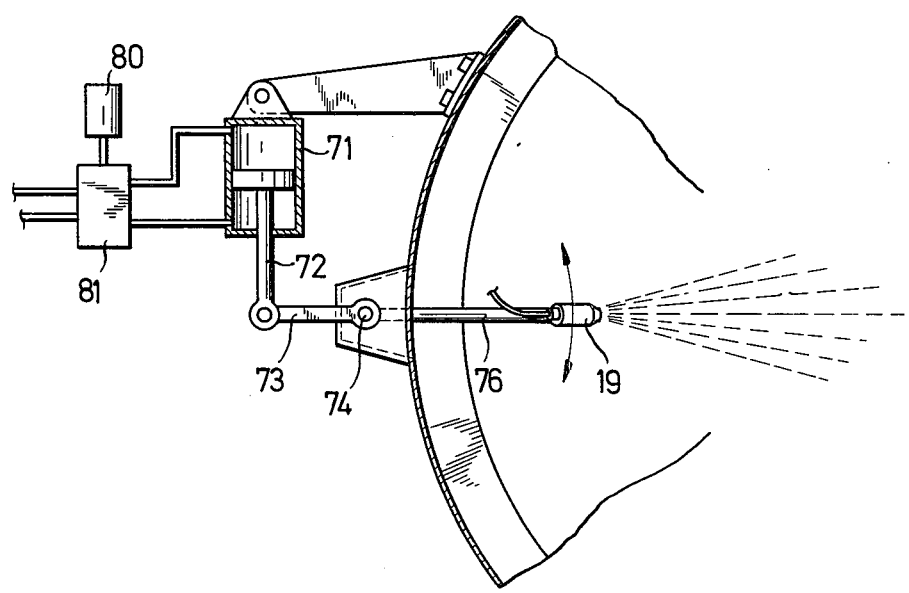
Figure 3:
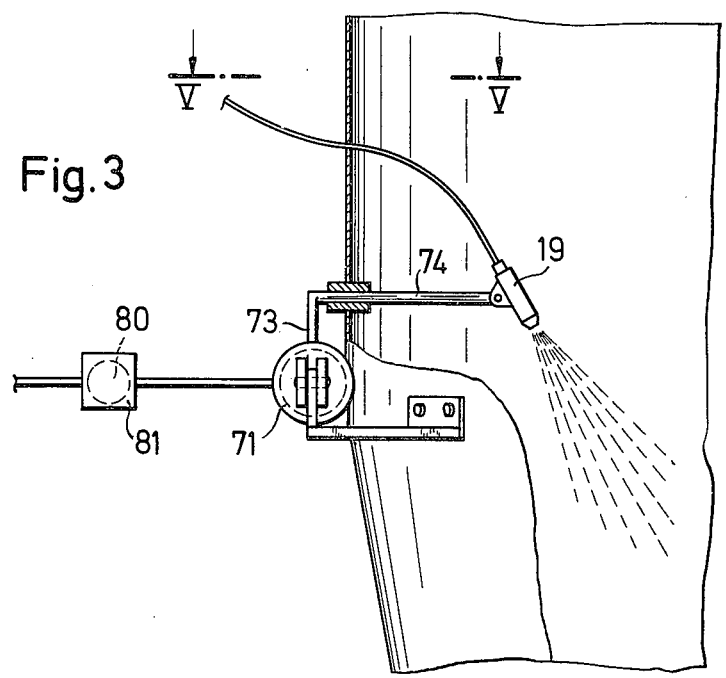
Figure 5:
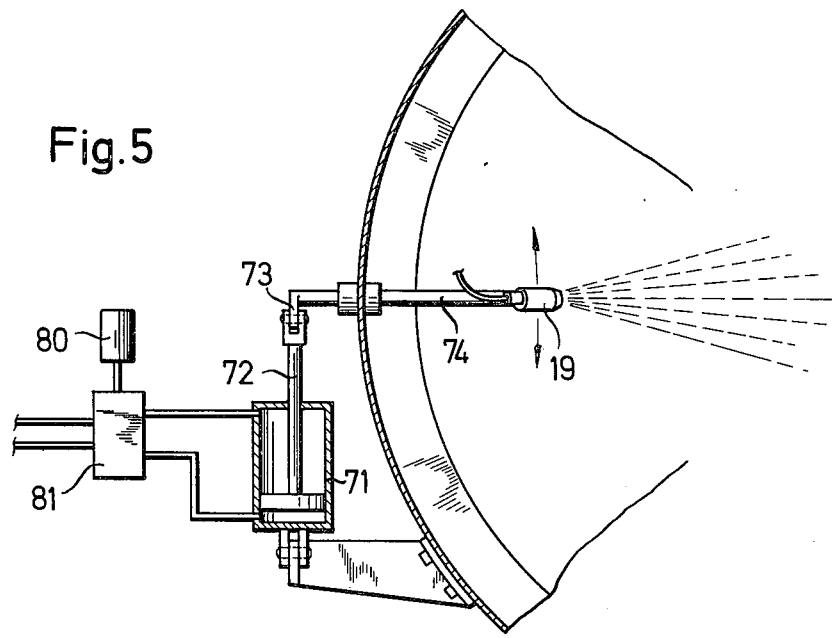

As already stated, the nozzle 19 is mounted for movement over a chosen path. FIGS. 2 and 4 show one embodiment and FIGS. 3 and 5 show another embodiment of a mechanism for effecting this movement. In either case, the drive is pneumatic or hydraulic. The pneumatic or hydraulic cylinder 71 is connected to a power source (not shown) via a valve combination 81 controlled by a time switch 80. The strokes of a piston rod 72 are converted into a pivoting movement of the nozzle 19 via a crank 73, 74. To this end, the piston rod 72 is articulated at the end of a crank arm 73 which is mounted rotatably by its other arm 74.

Referring to FIGS. 2 and 4, the second crank arm 74 is mounted upright in a hollow projection on the wall of the granulating chamber substantially perpendicularly to the perforated floor 3, a third arm 76 being radially secured to the arm 74 and projecting into the interior of the chamber and bearing the nozzle 19 at its free end. The mouth of the nozzle will therefore perform arcuate pivoting movements in a horizontal plane in accordance with the movement of the piston rod 72.

Referring to FIGS. 3 and 5, the second crank arm 74 is rotatably mounted in the wall of the granulating chamber substantially parallel to the perforated floor 3, the nozzle being so mounted directly at the end of this arm projecting into the chamber that the nozzle mouth is situated at a distance from the axis of rotation of this arm. The nozzle mouth will therefore swing along an arc in a vertical plane perpendicular to the perforated floor on movement of the piston rod 72.

The nozzle 19 can be adjusted and locked in its inclined position on the arm (FIG. 2) or 74 (FIG. 3).

The fluidized bed is first formed in lower zone 1a, the bed being of granular material the same as that to be granulated or of a different granular material. To distinguish it from the material being granulated, the material of the bed will be called bed granular material, and the material being granulated will be called product granular material.

Dry material intended for granulation is introduced into the granulating chamber 1, preferably by feeding it via the conduit 21. Simultaneously or subsequently thereto, the gas or hot-air is introduced via the ducts 8, 12 and 9 and the perforated floors 3 and 4. The dry material intended to granulation can be metered continuously or at intervals through the conduit 21 by means of the metering device 20. The liquefied substance intended for granulation is sprayed through the nozzle 19 in the form of a suspension, a solution or a mixture of such suspension and solution, if necessary with the admixture of a binder. The term "fluent material" will be used hereinafter to designate the dry material and the liquefied substance as defined above. The nozzle 19 is at the same time moved preferably with a rocking or circular motion, so that the individual zones of the fluidized bed are sprayed periodically and for a short time (0.2 to 30 seconds).

For optimum processing, it has been found in practice that the flow in the air screening chamber should be so adjusted that (a) the fraction of the particle sizes above 0.15 mm. constitutes at least 40–60 percent by weight of the total recycled material; (b) coarse fractions having particle sizes above 0.35 mm. are also recycled, and the proportion of these particle sizes above 0.35 mm. in the total quantity of material recycled is 10 to 20 percent by weight. It is also sometimes advantageous to recycle coarse fractions with particle sizes above 2 mm., although the proportion of these particle sizes in the total recycled quantity should be only 5 percent by weight maximum.

It is well known that the air pressure difference (flow resistance) $\Delta p$ in the fluidized bed is proportional to its weight. The flap 16 is therefore opened to a greater or lesser extent by the controller 40 depending upon whether $\Delta p$ exceeds or falls below the optimum value. The optimum value is dependent upon the product and on the required particle size and is set as a set-value at the controller 40.

The control flaps 14 and 15 are so adjusted that the flow velocity in the air screening chamber 2 is greater than in the granulating chamber 1. Consequently a lower pressure builds up in the air screening chamber 2 than in the lower zone 1a. Consequently, when the flap 16 is open or partially open, material is sucked through the discharge conduit 5 out of the fluidized bed and into the air screening chamber 2. The flow in the air screening chamber 2 is so adjusted that a mixture of fine and coarser material is blown back upwardly into the granulating chamber 1 through the recycling conduit 6. At the same time, the arrangement is preferably such, as illustrated, that the recycled particles fly through the liquid sprayed from the cone of the nozzle 19. The required granulate leaves the air screening chamber 2 through the conduit 31.

The fine particles reaching the upper zone 1c of the air granulating chamber 1 are precipitated on the filter 22. This filter is periodically cleaned by a reverse flow by appropriate change-over of the flaps 23 to 26. The reverse flow cleaning is preferably controlled automatically, the reverse flow being carried out, for example, for 0.5 second every 10 seconds, or for 30 seconds every 5 minutes, or with appropriate intermediate values.

The controllers 50 and 60 are used to control the particle size distribution in the fluidized bed. The use of these controllers is based on the new finding that there is a functional relationship between the temperature drop experienced by the gas or air on flowing through the fluidized bed 1a and the particle size distribution in the fluidized bed, the relationship being such that the temperature drop increases with increasing particle sizes, and vice versa. Accordingly, the controllers 50 and 60 selectively influence the heater 10 of the gas or air stream, the motor 18 for the agitator 17, and/or the liquid metering by the nozzle 19, either individually or in given combinations. The heater 10 should provide gas at a temperature sufficiently hot to evaporate liquid in the bed yet lower than that which will heat damage the material being granulated. Smaller particle sizes are obtained by reducing the liquid flow and/or increasing the heating and/or switching on or accelerating the agitator to apply a separating force to the bed, and vice versa.

The set-value for the controllers 50 and 60 is set for each product according to the required grain size.

The two controllers 50 and 60 should of course operate with the maximum possible accuracy. It has been found in practice that deviations of up to ± 30% are acceptable in some cases with certain products; deviations of less than ± 10% are practically always acceptable.

The following granulation and drying operations were carried out in the plant illustrated (main dimensions: diameter of the granulating chambers in zone 1a = 1000 mm. and in zone 1c = 1600 mm. overall height of the granulating chamber = 4000 mm. cross-section of the air screening chamber = 700 mm. × 70 mm., opening time of the flap 26 = 2 seconds, opening time of the flap 25 = 120 seconds):

EXAMPLE 1

Granulation and drying of a 50% solution of a condensation product of naphthalenesulphonic acid and formaldehyde in water (dispersing agent) at:

| | |
|---|---|
| Air inlet temperature: | 150°C. |
| Waste air temperature: | 85°C. |
| Fluidized bed temperature difference ΔT: | 10°C. ± 2°C. |
| Fluidized bed pressure difference Δp: | 110 mm. water column ± 5 mm. |
| Capacity: | 110 l. solution per hour |

Grain size:

| | Proportion — per cent by weight — of particles smaller than (mm.) | | | |
|---|---|---|---|---|
| | 0.05 | 0.5 | 1.0 | 2.0 |
| Fluidized bed | 6 | 92 | 98.8 | 99.8 |
| Product | 0.2 | 83.6 | 96.7 | 99.1 |

EXAMPLE 2

Granulation and drying of a 33% suspension based on a morpholine derivative of a triazenyl stilbene (optical bleach) in water with the addition of 5% per weight of glycerine, based on the dry material:

| | |
|---|---|
| Air inlet temperature: | 135°C. |
| Waste air temperature: | 55°C. |
| Fluidized bed temperature difference ΔT: | 6°C. |
| Fluidized bed pressure difference Δp: | 80 mm. water column |
| Capacity: | 90 litres of suspension per hour |

Grain size:

| | Proportion — per cent by weight — of particles smaller than (mm.) | | | |
|---|---|---|---|---|
| | 0.05 | 0.5 | 1.0 | 2.0 |
| Fluidized bed | 10 | 95 | 99 | 99.5 |
| Product | 0.5 | 80 | 92 | 99 |

Similar results were obtained by using solutions or suspensions of optical bleaches from the distyryldiphenyl group.

EXAMPLE 3

Granulation and drying of a 50% solution of a mixture of bone glue and polysulphone on a phenol basis in water (tanning agent) with Glaubersalt powder being metered directly into the fluidized bed:

| | |
|---|---|
| Air inlet temperature: | 140°C. |
| Waste air temperature: | 70°C. |
| Fluidized bed temperature difference ΔT: | 8°C. |
| Fluidized bed pressure difference Δp: | 110 ± 5 mm. water column |
| Capacity: | 65 l. of solution per hour 3 kg. of Glaubersalt powder per hour |

Grain size:

| | Proportion — per cent by weight — of particles smaller than (mm.) | | | |
|---|---|---|---|---|
| | 0.05 | 0.5 | 1.0 | 2.0 |
| Fluidized bed | 10.5 | 97 | 99.5 | 100 |
| Glaubersalt powder | 0.5 | 100 | | |
| Product | | 95 | 99 | 100 |

What is claimed is:

1. A process for producing a product granular material comprising the steps of:
   a. forming a fluidized bed of bed granular material by passing a stream of gas upwards through the bed to maintain the bed granular material in a fluidized state, said gas being sufficiently hot to evaporate liquid in the bed and having a temperature lower than that which will heat damage the material being granulated;
   b. dispersing onto the fluidized bed a fluent material taken from the group consisting of (1) a solution of the material to be granulated, (2) a suspension of the material to be granulated, (3) a mixture of such a solution and suspension, (4) dry granules of material to be granulated, (5) a solution of the material to be granulated plus a binder; (6) a suspension of the material to be granulated plus a binder; (7) a mixture of such a solution and suspension plus a binder; and (8) dry granules of material to be granulated plus a binder;

c. controlling said dispersing of the fluent material onto the bed and the temperature of the gas flowing upwards through the bed so that the temperature drop in the vertical direction across the bed from a point slightly above the bottom of the bed to a point just above the point from which the fluent material is dispersed is not less than 4°C and not more than 16°C and any liquid in the bed is evaporated;

d. withdrawing from the bed a granular material which, in the initial stages of the process, is a mixture of the bed granular material and the product granular material, and as the process continues, contains less of the bed granular material and more of the product granular material;

e. screening the withdrawn granular material for separating it into selected sizes;

f. recycling to the bed part of the withdrawn granular material including all of the fine fractions having a granular size smaller than 0.15 mm as well as a portion of the coarse fractions having a granular size greater than 0.15 mm, the balance of the coarse fractions being withdrawn from the process as the granular material to be produced; and g. controlling the withdrawal of granular material from the bed and the weight of withdrawn material which is recycled so that the pressure drop in the vertical direction across the bed between substantially the same points as the temperature drop does not fall below 56 mm water column and does not rise above 150 mm water column, whereby in the granular material withdrawn from the bed at least 20% of the granules have a granule size from 0.15 to 2 mm.

2. A process as claimed in claim 1 further comprising applying a grain separating force to the bed and controlling the dispersing rate of the fluent material, the temperature of the gas stream flowing upwards through the bed, and said grain separating force, so that the temperature drop in the bed is not less than 4°C and not more than 15°C.

3. A process as claimed in claim 2, in which the step of applying the grain separating force comprises applying a constant grain separating force.

4. A process as claimed in claim 1, in which the step (b) comprises dispersing said fluent material at a constant rate.

5. A process as claimed in claim 1, in which the step (c) comprises keeping the temperature of the gas at the entrance of the bed constant.

6. A process as claimed in claim 1, in which the step (f) comprises recycling the said coarse fractions in an amount of 40 to 60% by weight of the recycled material.

7. A process as claimed in claim 1, in which the step (f) comprises recycling the coarse fractions with granular sizes greater than 0.35 mm in an amount of 10 to 20% by weight of the recycled material.

8. A process as claimed in claim 1, in which the step (f) comprises recycling the coarse fractions with granular sizes greater than 2 mm in an amount up to 5% by weight of the recycled material.

9. A process as claimed in claim 1, in which the fluent material is a solution of a condensation product of naphtalenesulphonic acid and formaldehyde in water.

10. A process as claimed in claim 1, in which the fluent material is a solution of a mixture of bone glue and polysulphone on a phenol basis in water with sodium sulfate (Glaubersalt) powder.

11. A process as claimed in claim 1, in which the fluent material is a suspension based on a morpholine derivative of a triazonyl stilbone in water.

* * * * *